United States Patent [19]

Lacoste

[11] Patent Number: 4,887,342

[45] Date of Patent: Dec. 19, 1989

[54] DEVICE TO FORCE OPEN THE DOOR OF A SAFETY DEPOSIT BOX

[76] Inventor: Jacques-André Lacoste, 52, 64iéme Avenue, St-Eustache (Quebec), Canada, J7P 3P3

[21] Appl. No.: 268,704

[22] Filed: Nov. 8, 1988

[51] Int. Cl.[4] .............................................. B23P 19/04

[52] U.S. Cl. .......................................... 29/259; 29/265

[58] Field of Search ................. 29/256, 259, 260, 265, 29/266, 254, 283.5, 263

[56] References Cited

U.S. PATENT DOCUMENTS

| | | | |
|---|---|---|---|
| 1,496,303 | 6/1924 | Dieringer | 29/265 |
| 2,720,021 | 10/1955 | Davis | 29/265 |
| 2,821,777 | 12/1958 | Keister . | |
| 3,599,311 | 8/1971 | Ellis | 29/259 |
| 3,816,899 | 6/1974 | Kitts . | |
| 4,060,884 | 12/1977 | Hamilton . | |
| 4,361,944 | 12/1982 | Hamilton | 29/256 |
| 4,694,569 | 9/1987 | Colvell et al. | 29/260 |

FOREIGN PATENT DOCUMENTS

| | | | |
|---|---|---|---|
| 494711 | 10/1938 | United Kingdom | 29/266 |

*Primary Examiner*—Robert C. Watson
*Attorney, Agent, or Firm*—Nixon & Vanderhye

[57] ABSTRACT

The present disclosure describes a device to force open the door of a safety deposit box having a lock. The device comprises a key having an end terminated by a portion extending in a direction perpendicular to the longitudinal axis of the key, the end being adapted to be inserted into the keyhole of the lock, the portion extending sufficiently in the direction so that the portion can rest against the interior surface of the door beyond the cylinder of the lock after that the key has been inserted into the keyhole and laterally displaced with respect to the cylinder. The device also comprises a puller for pulling the key, the puller having a fastening mechanism for securing the key to the puller, and legs adapted to rest against a solid surface adjacent to the door which can be forced open by pulling the key while the portion rests onto the interior surface of the door, by means of the puller having its legs resting against the solid surface.

5 Claims, 1 Drawing Sheet

DEVICE TO FORCE OPEN THE DOOR OF A SAFETY DEPOSIT BOX

FIELD OF THE INVENTION

The present invention relates to a device to force open the door of a safety deposit box having a lock.

BACKGROUND OF THE INVENTION

Many methods and devices have been proposed to force open safety deposit boxes. Some of them have met with mitigated success. Few methods in use today are described below.

One of these methods is named "punching the lock". It involves a punching of the lock with a steel punch. This method invariably causes severe damage to the tray placed inside the safety box. Sometimes, the hinges are damaged beyond repairs and the back rest of the door is damaged during the operation.

Another one implies a picking of the lock. This method can only be used by a trained technician or experienced locksmith. A small hole is drilled in the door immediately above the keyhole and, by the use of a false key and a small diameter steel rod, the fingers of the lock are aligned to open it. It is mostly used where the lock must be saved. Afterward, the hole must be plugged and door surfaces re-finished before re-utilization.

Another method implies a drilling of the three holding screws of the lock by using a template to locate the screws. Afterward, extensive door repairs and lock replacement are needed.

The lock can also be pulled. A thin split steel blade is inserted in the keyhole, and it expands when pulling pressure is applied. The action of the steel blade is similar to that of a fish hook. The pressure is applied via an eye at the outer end of the blade by means of shaped brackets or levers. The drawbacks of this method is that, against the sturdier types of locks, the blade will break or cut through the brass cylinder of the lock and come out leaving the door locked. Sometimes, the cylinder is pulled out from the lock, leaving the door locked.

A popular method used by technicians is to drill a hole in the cylinder of the lock, thread this hole using a tap and screw a bolt of the proper size into this threaded hole. Then, using a lever and fulcrum, apply outward pressure on the bolt until door opens. Should the cylinder come out, a steel hook is inserted in the hole to replace the bolt. The drawbacks with this method are that the length of the lever required, which length is from 2 to 3 feet, makes it ackward and sometimes impossible to use it in a confined space. A user may hurt himself as the pressure required to break the lock is supplied by the user's hands pushing against the lever. Sometimes, the hinges are damaged because of the type of pressure applied. This method does not work on doors having a length of 10".

OBJECTS OF THE INVENTION

It is an object of the present invention to provide an efficient device to force open the door of a safety deposit box that can do the job quickly and easily.

It is another object of the present invention to provide a device to force open the door of a safety deposit box that is reliable and can do the job repeatedly without breakdown.

It is another object of the present invention to provide a device to force open the door of a safety deposit box that is safe and without danger to the user of the device.

It is another object of the present invention to provide a device to force open the door of a safety deposit box that is light, simple and operable by an untrained person.

It is another object of the present invention to provide a device to force open the door of a safety deposit box without causing any damage to the door, the hinges or the tray of the box and its content.

The objects, advantages and other features of the present invention will become more apparent upon reading of the following non restrictive description of a preferred embodiment thereof, given for the purpose of examplification only with reference to the accompanying drawing.

SUMMARY OF THE INVENTION

According to the present invention, there is provided a device to force open the door of a safety deposit box having a lock, comprising:

a first key having an end terminated by a portion extending in a direction perpendicular to the longitudinal axis of said first key, said end being adapted to be inserted into the keyhole of said lock, said portion extending sufficiently in said direction so that said portion can rest against the interior surface of said door beyond the cylinder of said lock after that said first key has been inserted into said keyhole and laterally displaced with respect to said cylinder; and pulling means for pulling said first key, said pulling means having a fastening means for securing said first key to said pulling means, and legs adapted to rest against a solid surface adjacent to said door which can be forced open by pulling said first key while said portion rests onto the interior surface of said door, by means of said pulling means having said legs resting against said solid surface.

BRIEF DESCRIPTION OF THE DRAWING

The FIG. 1 shown in the drawing is an exploded view of a device to force open a safety deposit box according to the present invention.

DETAILED DESCRIPTION OF THE DRAWING

Figure 1:
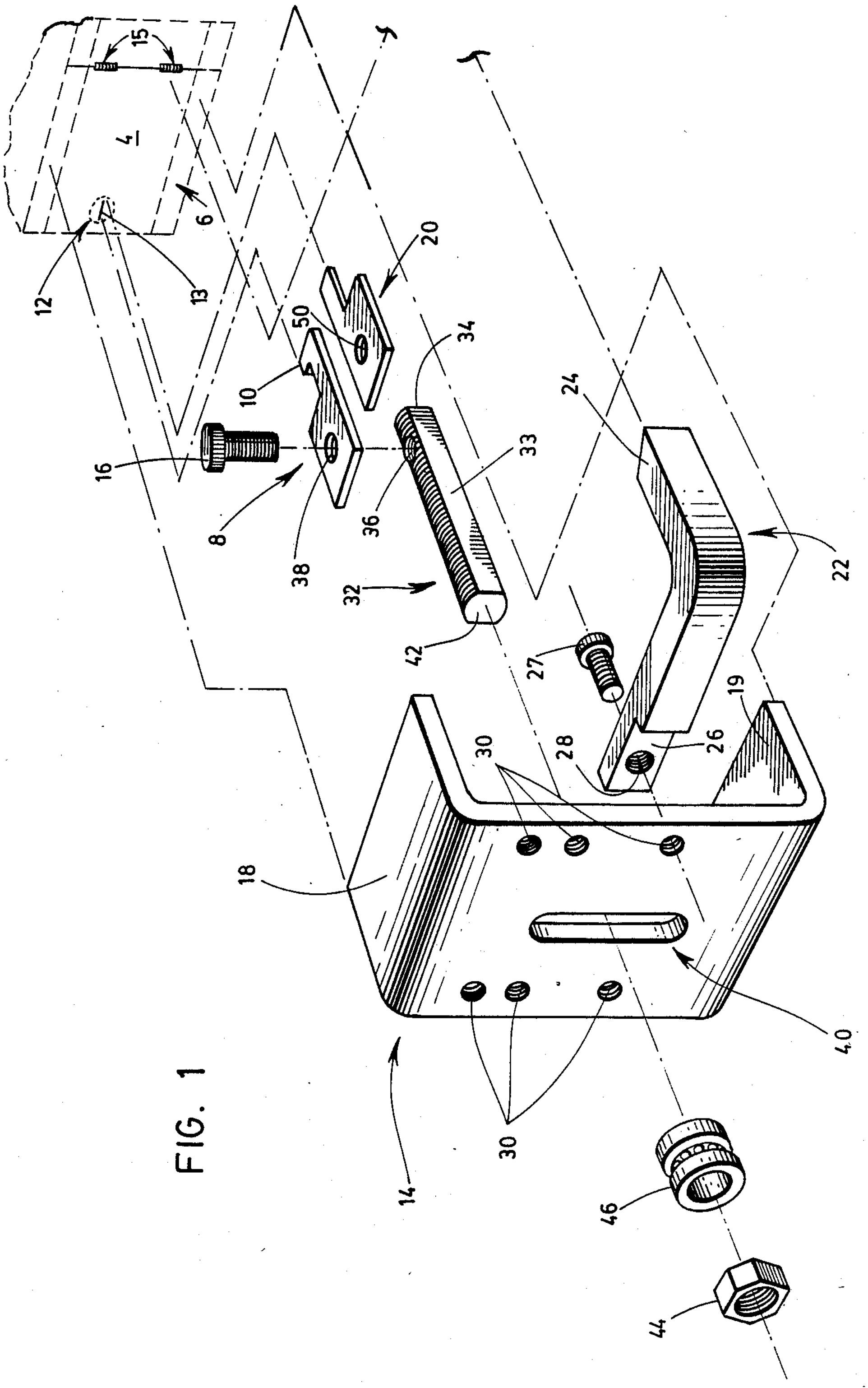

Referring now to FIG. 1, there is shown a device to force open the door 4 of a safety deposit box 6 having a lock 12. The device comprises a first key 8 having an end terminated by a portion 10 extending in a direction perpendicular to the longitudinal axis of the first key 8. The end of the first key 8 is adapted to be inserted into the keyhole 13 of the lock 12. The portion 10 extends sufficiently in the perpendicular direction so that it can rest against the interior surface of the door 4 beyond the cylinder of the lock 12 after that the first key 8 has been inserted into the keyhole 13 and laterally displaced with respect to the cylinder.

The device also comprises a puller for pulling the first key 8. The puller has a fastening screw 16 for securing the first key 8 to the puller. The puller has also legs 18 and 19 adapted to rest against a solid surface adjacent to the door 4.

The door 4 can be forced open by pulling the first key 8, while the portion 10 rests onto the interior surface of the door 4, by means of the puller having its legs 18 and 19 resting against the solid surface.

The device is also provided with a second key 20 having an end adapted to be inserted into the keyhole 13, beside the first key 8, in a space created in the keyhole 13 when the first key 8 is laterally displaced, to lock the first key 8 in a position where the portion 10 rests against the interior surface of the door beyond the cylinder of the lock 12.

The puller comprises a body 14 provided with a third leg 22 having an extremity 24 adapted to rest against a part of the exterior surface of the door 4. That part is adjacent to the hinges 15 of the door 4 to reduce pressure exerted on them when the door 4 is forced open.

The third leg 22 is detachable from the body 14. The second extremity 26 of the third leg 22 is provided with a hole 28. The body 14 is also provided with two series of three threaded holes 30 respectively positioned on opposite sides of said body 14. The third leg 22 is fixed onto the body 14 by means of one of the threaded holes with a screw 27.

The puller also comprises a threaded rod 32 having an end 34 provided with a threaded hole 36. The threaded rod 32 is provided with two opposite lateral flat surfaces 33 along its length. The other end of the first key 8 is provided with a hole 38. A fastening screw 16 is adapted to secure the threaded rod 37 to the first key 8 by means of their respective hole 36 and 38. The body 14 comprises an elongated aperture 40 for receiving the threaded rod 32. The elongated aperture 40 has a width adapted to match with the flat surfaces 33 of the rod 32 so that the rod 32 cannot rotate on itself when it is inserted into the aperture 40. The puller further comprises a nut 44 and a bearing 46 by which the first key 8 can be pulled with respect to the body 14 by screwing the nut 44 with the bearing 46 on the other end 42 of the threaded rod 32 emerging from the elongated aperture 40.

The extremity 24 of the third leg 22 is provided with a surface forming an angle of substantially 25° with the exterior surface of the door 4 when the third leg 22 is resting against it.

The two keys 8 and 20 are made of high tensile spring steel 0.055". The first key 8 has a length of 1¾". The portion 10 is extending over 5/32" in the perpendicular direction. The middle portion of the first key has a width of 7/32". The other extremity of the first key forms a square of ⅝" by ⅝". The hole 38 is formed by a 13/64" drill.

The second key 20 has a tail having a length of 1 7/16" and a width of 5/32". The whole length of the second key 20 is 1 15/16". The handle of the second key forms a square of ½" by ½" and is provided with a hole 50 provided to help the user when he is getting it out from the lock 12. This hole 50 is formed by a 13/64" drill.

The nut 44 is a L9 steel nut ½" NF. The thrust bearing 46 is a self-contained ½" thrust bearing. The fastening screw 16 is made of L8 steel. The dimensions of this screw 16 are 8-32 by ⅝". The body of the screw 16 is provided with an unthreaded portion between its threaded portion and its head. This unthreaded portion forms a place where the first key 8 can float on the screw 16 when the first key 8 is secured to the threaded member 32. This unthreaded portion has a length of ⅛".

The threaded rod 32 has a length of 2⅝". This threaded rod 32 is provided with two flat surfaces respectively on its two lateral sides. The distance between these two flat surfaces is ⅜". The diameter of this threaded rod 32 is ½". The threaded hole 36 is made with a 8-32 tap. This threaded rod is made from a ½" by 36" filleted steel rod NF L9 where two portions of 1/16" have been ground of its two lateral sides.

The first 18 and second legs 19 of the puller have a height of 2", a width of 2" and a thickness of ¼". The first leg 18 with the main portion of the body 14 form an arc of a circle having a radius of ¼", and the second leg 19 with the main portion of the body 14 form an arc of a circle having a radius of ⅞".

The body 14 has a length of 5¾", a width of 2", and a thickness of ¼". The three threaded holes 30 of each series are respectively positioned at ¾", 1⅜" and ½" from the extremity of the body 14 provided with the first leg 18. Each series of holes 30 is situated respectively at ¼" from opposite lateral sides of the body 4. The distance between the first 18 and second 19 legs of the puller is 5 ¼". The elongated aperture 40 has a length of 3" and a width of ⅜". The threaded holes 30 are made with a ¼-20 tap.

This aperture 40 will fit doors of 1½" by 5" through doors of 5" by 5". The body 14 of the puller is made of cold rolled steel of ¼" by 2" that is tempered after machining.

The extremity 26 of the third leg 22 is provided with a shoulder which can rest against one of the lateral sides of the body 14 when the third leg 22 is fixed onto it. The third leg 22 has a height of 1⅞", a width of ½" and a thickness of ⅜". This third leg 22 is made of cold rolled steel bars of ⅜" by ½" that are tempered after machining. The holding screw 27 is a standard Allan head ¼-20 by ½" made of L8 steel. The hole 28 is made of a 17/64" drill.

In operation, the first key 8 is inserted into the keyhole 13 of the lock 12 and laterally displaced with respect to the cylinder of the lock 12 so that the portion 10 of the first key 8 can rest against the interior surface of the door 4 beyond the cylinder. Then, the second key 20 is inserted into the keyhole 13, beside the first key 8, in the space created in the keyhole 13 when the first key 8 is laterally displaced, to lock the first key 8 in a position where the portion 10 rest against the interior surface of the door 4 beyond the cylinder.

The threaded rod 32 is secured to the first key 8 by means of the fastening screw 16. When the first key 8 is secured onto the threaded rod 32, it is free to move over the unthreaded portion of the screw 16 by 1/16".

The extremity 42 of the threaded rod is inserted into the aperture 40 of the body 14. The thrust bearing 46 is positioned over the extremity 42 of the rod 32 emerging from the aperture 40, and the nut 44 is screwed on the extremity 42 emerging from the bearing 46. Then, the first 18 and second 19 legs of the body 14 are adjusted to rest against the solid surface adjacent to the door 4.

The third leg 22 can now be fixed by means of one of the threaded holes 30 onto the body 14 of the puller according to the dimensions of the door 4. The third leg 22 is fixed by means of the screw 27 in such a manner that the extremity 24 of the third leg 22 rest against a part of the door 4 that is adjacent to the hinges 15 of the door 4 to reduce pressure exerted on them when the door is forced open.

The user can now tighten the nut 44 on the threaded rod 32 by means of a spanner until the door 4 of the deposit box is forced open.

The threaded rod 32 must always rest on the top of the first key 8 regardless of the position of the door on the nest which usually comprises several safety deposit boxes.

The first 18 and second 19 legs of the puller must always rest on the frame adjacent to the door to be opened. The third leg 22 is not always necessary, but it must be used on all 5" doors. Failure to do so may damage or break the hinges of the door. The third leg 22 must not be used when the puller is used on 10" doors. Should the third leg 22 not be removed, it will prevent door from opening and possibly break the first key 8.

The use of the first key 8 allows a hooking on the interior surface of the door itself rather than a locking into the cylinder of the lock, thus eliminating one of the important drawbacks of known methods. The keys 8 and 20 are made of high tensile spring steel capable of withstanding double the pressure required to break common locks. The threaded rod 32 is grounded flat on its two lateral sides to fit the $\frac{3}{8}$" aperture of the body 14 of the puller to prevent the first key 8 from twisting when the nut 44 is tighten. The body 14 of the puller itself is made of steel for rigidity and sturdiness. The third leg 22 is made of steel and its sole purpose is to protect the hinges 15 of 5" doors from the pressure exerted onto them when the door is forced open. It is not required on 10" doors as the center of gravity is shifted at such a distance, due to the position of the lock 12, the pressure against the hinges 15 becomes negligible.

The thrust bearing 46 is used to allow smooth and even tightening of the nut 44 on the threaded rod 32. As the nut 44 is tightened on the threaded rod 32, it forces the door 4 up, breaking the bolt of the lock 12 and leaving the door 4 open.

Although, the present invention has been explained hereinabove by way of a preferred embodiment thereof, it should be pointed out that any modifications of this preferred embodiment, within the scope of the appended claims is not deemed to change o alter the nature and scope of the invention.

The embodiments of the invention in which an exclusive property or privilege is claimed are defined as follows:

1. Device to force open the door of a safety deposit box having a lock, comprising:

a first key having an end terminated by a portion extending in a direction perpendicular to the longitudinal axis of said first key, said end being adapted to be inserted into the keyhole of said lock, said portion extending sufficiently in said direction so that said portion can rest against the interior surface of said door beyond the cylinder of said lock after that said first key has been inserted into said keyhole and laterally displaced with respect to said cylinder; and pulling means for pulling said first key, said pulling means having a fastening means for securing said first key to said pulling means, and legs adapted to rest against a solid surface adjacent to said door which can be forced open by pulling said first key, while said portion rests onto the interior surface of said door, by means of said pulling means having said legs resting against said solid surface, said device further comprising a second key having an end adapted to be inserted into said keyhole, beside said first key, in a space created in said keyhole when said first key is laterally displaced, to lock said first key in a position where said portion rest against the interior surface of said door beyond said cylinder.

2. Device according to claim 1, wherein said pulling means comprises a body having first and second legs adapted to rest against said solid surface; and a third leg having an extremity adapted to rest against a part of the exterior surface of said door, said part being adjacent to the hinges of said door to reduce pressure exerted on said hinges when said door is forced open.

3. Device according to claim 2, wherein said third leg is detachable from said body, the second extremity of said third leg being provided with a hole, and wherein said body is provided with two series of threaded holes respectively positioned on opposite sides of said body, said third leg being fixed onto said body by means of one of said threaded holes with a screw.

4. Device according to claim 2, wherein:

said pulling means comprise a threaded rod having an end provided with a threaded hole, said threaded rod being provided with two opposite lateral flat surfaces along its length;

the other end of said first key is provided with a hole;

said fastening means comprise a screw adapted to secure said threaded rod to said first key by means of their respective hole;

said body comprises an elongated aperture having a width adapted to match with the flat surfaces of said rod so that said rod cannot rotate on itself when said threaded rod is inserted into said aperture; and said pulling means further comprises a nut and a bearing by which said first key can be pulled with respect to said body by screwing said nut with said bearing on the other end of said threaded rod emerging from said elongated aperture.

5. Device according to claim 3, 4 or 5, wherein said extremity of said third leg is provided with a surface forming an angle of substantially 25° with the exterior surface of said door when said third leg is resting against the exterior surface of said door.

* * * * *